Figure 1:
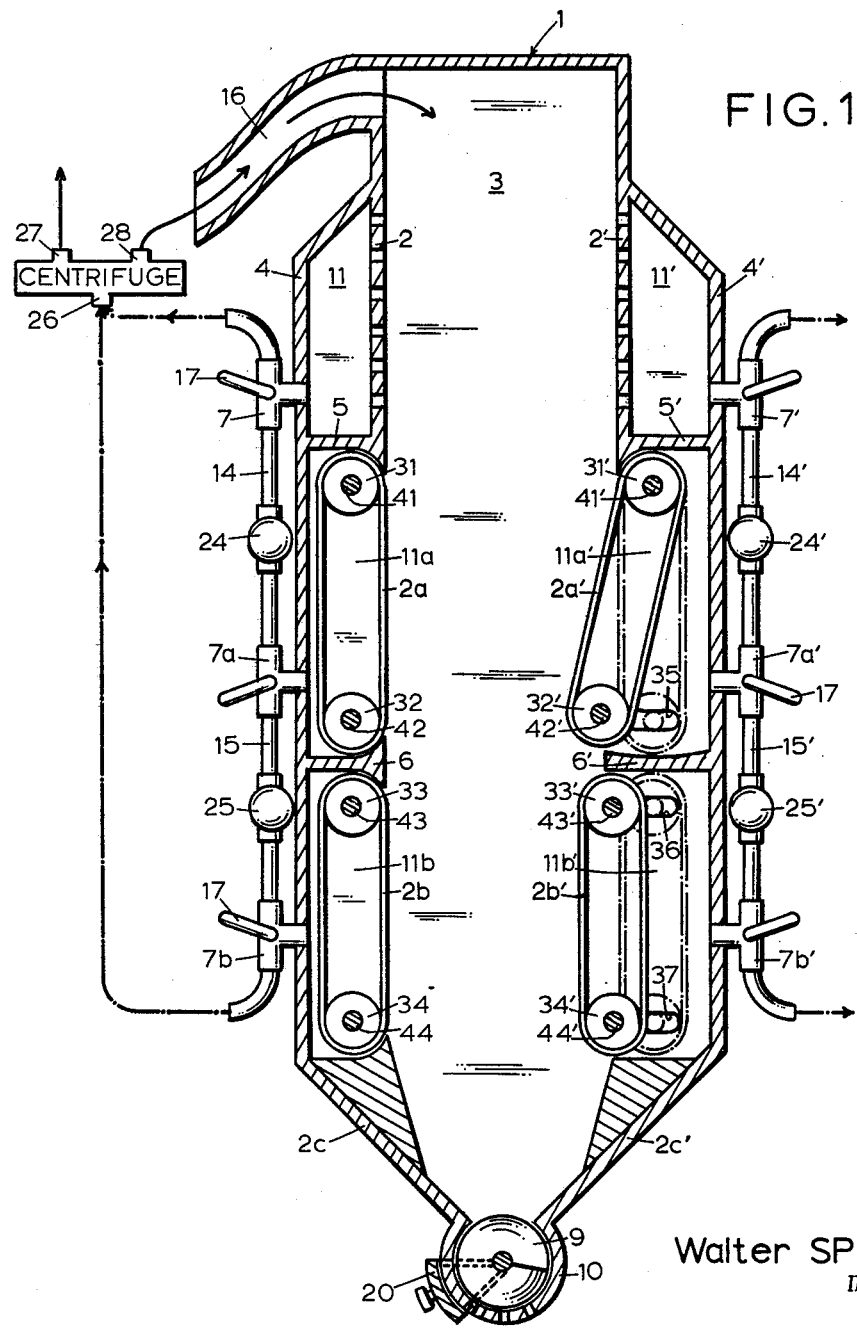

Walter SPIELVOGEL
INVENTOR.

BY
Karl F. Ross
AGENT

United States Patent Office 3,135,610
Patented June 2, 1964

3,135,610
PROCESS FOR EXTRACTING LIQUOR FROM A FERMENTED PULPY MASS
Walter Spielvogel, Essen-Bredeney, Germany, assignor to Weigelwerk AG., Essen, Germany, a corporation of Germany
Filed Apr. 11, 1962, Ser. No. 186,799
Claims priority, application Germany Apr. 14, 1961
6 Claims. (Cl. 99—52)

My present invention relates to a process and an apparatus for the continuous recovery of fermentable liquors from a pulp-like mass and, more particularly, for extracting the wort used in brewing beer from the mash and/or processing the wort-hops infusion.

In my copending application Ser. No. 154,146, filed November 22, 1961, I have already disclosed a vertical or nearly vertical duct, with perforated walls, through which the pulpy mass to be processed is fed in a continuous motion, the liquor to be extracted from the mass being withdrawn laterally from the duct at one location while a fresh supply of flushing liquid designed to replace the recovered juice is continuously admitted laterally into the duct at another location. The duct may be divided into a plurality of sections disposed in cascade for consecutive traversal by the mass, each section being provided with at least one external port serving as a fluid inlet or outlet.

An object of my present invention is to provide, in an apparatus of the type disclosed in my copending application above referred to, means for making the advance of the charge through the duct wholly or partly independent of gravity in order to enable the rate of its motion to be varied in accordance with specific requirements.

A more particular object of this invention is to provide means for independently controlling the speed of advance of the charge in different duct sections whereby, through selective acceleration and retardation or possible reversal of motion, the density of the charge as well as its residence time at different locations may be varied for optimum treatment conditions.

It is also an object of the instant invention to provide means for agitating the charge at one or more locations within the duct to promote contact between its particles and the confining filter surfaces of the inner duct wall.

A feature of my invention resides in the provision, as part of a duct wall for the continuous feeding of a pulpy mass to be treated, of perforated conveyor means driven at a preferably variable rate of speed to control the advance of the mass through the duct or a section thereof. Advantageously, pairs of conveyor belts are positioned at opposite duct walls in several sections, with or without interposition of duct portions formed by stationary walls. If the paired conveyors are moved at the same speed in the same direction along their respective wall surfaces, the motion of the charge in the duct section will be uniform; if the speeds vary greatly or are in opposite directions, at least part of the mass in the section will undergo a rotary motion while advancing through the section by virtue of a prevailing velocity component and/or under pressure from the charge of an adjacent section. Although it will still be convenient to position the duct vertically or nearly so, this is no longer indispensable in an apparatus embodying the present improvement.

The conveyors of a section, or at least one of them, may be additionally mounted for pivotal or linear transverse movement to vary the effective cross-section of a duct section and the pressure exerted upon the charge therein. This relative mobility of the duct walls or portions thereof, already disclosed in my copending application identified above, also facilitates cleaning of the duct.

By the system herein disclosed it thus becomes possible to control the movement of a charge through a treatment duct in such manner that substantially uniform concentrations of liquor may be recovered therefrom as the fresh mash is moved along at a relatively slow rate whereas the partly spent material is accelerated to increase the mass of malt in contact with the extracting liquor within a given time interval. The agitation afforded by effectively opposite rotation of the conveyors also facilitates the dislodgment of adhering particles from the vicinity of the duct walls so that the more centrally positioned layers of the charge can be subjected to more vigorous flushing.

Figure 2:
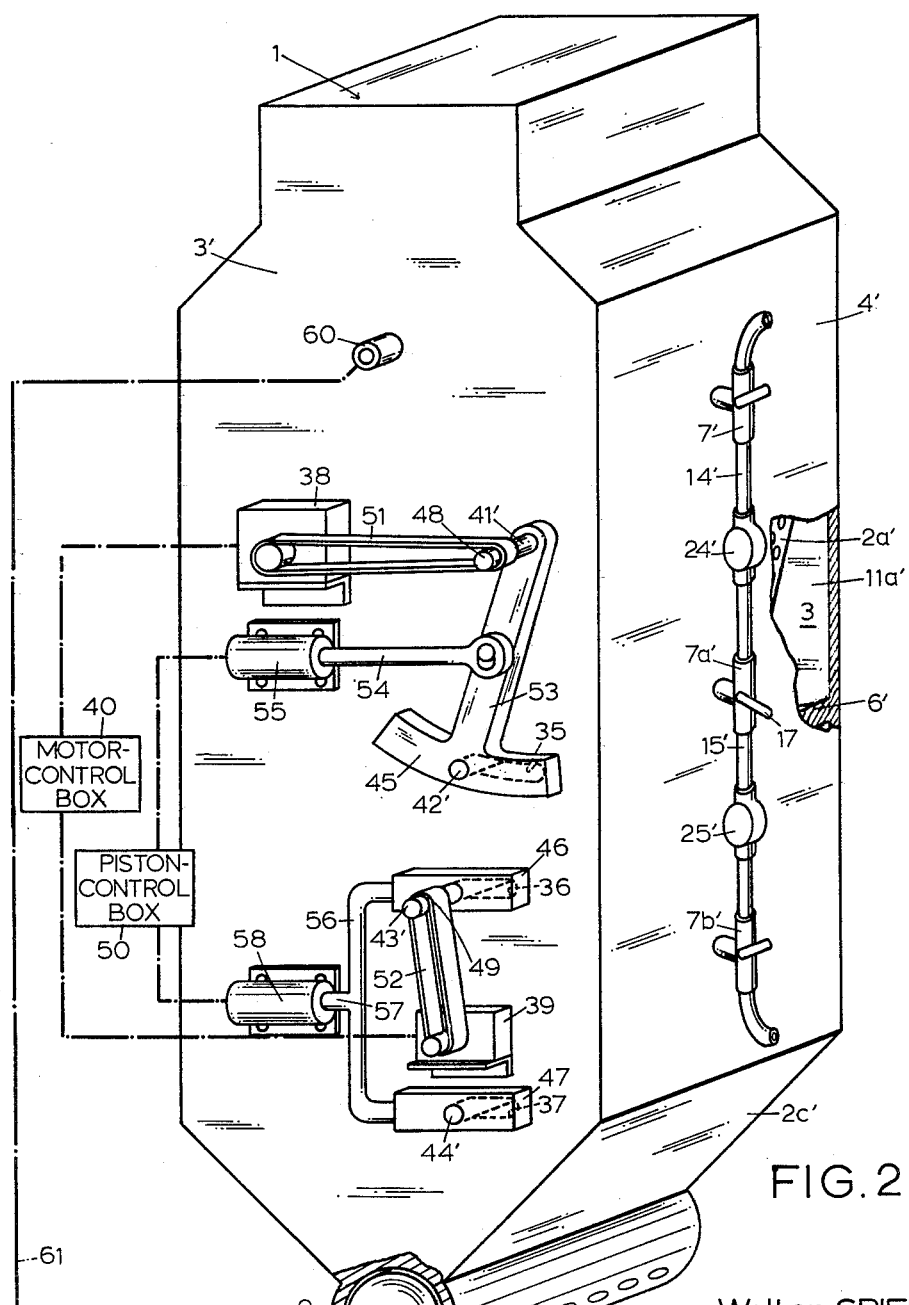

The above and other objects, features and advantages of my invention will become more readily apparent from the following description, reference being made to the accompanying drawing in which:

FIG. 1 is a longitudinal cross-sectional view of an apparatus for extracting wort from malt in accordance with a preferred embodiment; and FIG. 2 is a perspective view of the same apparatus.

A vertical duct 1 is defined by two opposite perforated side wall sections 2 and 2', perforated conveyor belts 2a, 2b and 2a', 2b', forming downward extensions of these sections, and end walls 3, 3'. The composite side walls 2, 2a, 2b and 2', 2a' and 2b' are shielded by respective outer walls 4 and 4' forming therewith a series of filter chambers 11, 11a, 11b and 11', 11a', 11b' which are separated from one another by horizontal partitions 5, 5', and 6, 6'. Each of these chambers is provided with a port 7, 7a, 7b and 7', 7a', and 7b', respectively.

A feed screw 9 within a horizontal cylindrical housing 10 operates, in the manner explained in my copending application, to discharge the draff or spent malt sliding down from the bottom of the duct along the converging lower walls 2c, 2c' into the cylindrical housing 10. A pan 21 serves to catch residual liquor passing through perforations in the housing which can be selectively covered by a slide 20.

The spacing of the filter walls 2, 2a, 2b and 2', 2a', 2b', thus the thickness of the mash cake therebetween, may be assumed by way of illustration to range from 15 to 40 cm.

The external connections for the transfer of fluid between the several filter chambers as well as to and from an external circulation system, including a source of sparging liquid (e.g. water), may be similar to those disclosed in my earlier application and may, for example, allow for the establishment of alternate flow paths through chambers 11b, 11b', 11a', 11a, 11, 11' or through chambers 11b', 11b, 11a, 11a', 11', 11. For this purpose the ports 7, 7a, 7b and 7', 7a', 7b' are interconnected by conduits 14, 15 and 14', 15' which may include forced-circulation means such as pumps 24, 25 and 24', 25'. The pumps, whose delivery rate is preferably adjustable, may also be reversible whereby sparging water may be selectively admitted at either an upper or a lower port, the wort being withdrawn at the opposite end. In order to establish the desired sense of circulation, the several ports may be designed as valves controlled by suitable means such as handles 17. The wort withdrawn from the apparatus, if still cloudy, may be passed through a centrifuge 26 from which the clear liquor is led off at 27 whereas the separated albuminous solids are returned at 28 to the inlet 16 of duct 1. The liquid recovered from pan 21 may be similarly recirculated.

The conveyors 2a, 2b are mounted on rollers 31, 32, 33, 34 whose shafts 41, 42, 43, 44 are journaled at fixed locations within end walls 3, 3'. The rollers 31', 32', 33', 34' of conveyors 2a', 2b' have shafts 41', 42', 43', 44' of which, however, only the first one is shown to occupy a fixed position. Shaft 42' passes through arcuate slots 35 in walls 3, 3' whereby the conveyor 2a' can swing about shaft 41' and roller 31' into an inwardly tilted position shown in solid lines in FIG. 1; shafts 43', 44' are guided in straight horizontal wall slots 36, 37 for translational inward displacement of the belt 2b', again as illustrated in solid lines. The normal positions of belts 2a', 2b' in line with wall section 2' have been shown in dot-dash lines. All the conveyor belts may consist, for example, of stainless-steel mesh.

As seen in FIG. 2, the slots 35, 36, 37 are externally overlain by cover plates 45, 46, 47 which form bearings for the projecting ends of shafts 42', 43', 44'. A pulley 48 on shaft 41' and a pulley 49 on shaft 43' are driven by motors 38, 39, mounted on the outside of wall 3', via respective belts 51, 52. Cover plate 45 is secured to an arm 53 which swings on the shaft 41' under the control of a piston 54 projecting from a hydraulic cylinder 55. Cover plates 46, 47 are fastened to the ends of a bifurcate link 56 carried on a piston 57 which projects from a hydraulic cylinder 58. The admission of oil or other hydraulic fluid to the cylinders 55, 58 is selectively carried out with the aid of a piston-control box 50, whereas the speed of shafts 41', 43' and therefore of conveyors 2a', 2b' is independently determined by an operator with the aid of a motor-control box 40. At least one shaft of each of belts 2a and 2b, e.g. shafts 41 and 43, are driven by other motors, not shown, which may be carried on wall 3 opposite motors 38, 39 and which are also controlled by the box 40. Drive belt 52 is assumed to be sufficiently stretchable to allow for the transverse displacement of shaft 43' in its slots 36.

It will be apparent that the belts 2a', 2b' may, if desired, also be swung outwardly, i.e. beyond their dotted-line positions, to enlarge the lower half of the duct. The conveyor motors, being reversible, may be operated by box 40 in either sense so that the associated conveyors impart an upward or a downward force to the mash in contact therewith. If two associated conveyors (e.g. 2a, 2a') rotate in the same absolute sense (say, clockwise) and therefore in mutually opposing directions, the charge therebetween will be set in rotating motion upon which a linear, for example downward, velocity component may be superimposed. Generally, any speed of advance (including reverse motion) within the operational limits of the system may be imparted to the charge by the system described.

The duct 1 may be provided with one or more inlets 60 through which draff from the discharge end of screw 9 may be readmitted into its interior, as indicated schematically at 61 in FIG. 2. The reintroduced material will be intimately mixed with the charge by suitable means, e.g. through agitation of the charge with effectively opposite rotation of the conveyors of the duct section as described above.

It will be apparent that both conveyors of a pair could be made tiltable or displaceable parallel to themselves and that other variations in the arrangement described and illustrated could be made without departing from the spirit and scope of the invention as defined in the appended claims.

I claim:

1. A process for extracting a liquor from a fermented pulpy mass in an elongated vessel, comprising the steps of advancing said mass over a substantially longitudinal path within said vessel, continuously injecting a flushing liquid into said mass from one side of said path, continuously recovering the liquor expelled by said flushing liquid from the opposite side of said path, and altering the rate of advance of said mass along said path within said vessel at different longitudinal portions therein corresponding to different stages of the process.

2. A process according to claim 1 wherein said mass is forcibly entrained along at least one of said sides.

3. A process according to claim 2 wherein said mass is forcibly entrained at different rates along said one and said opposite sides.

4. A process according to claim 2 wherein said mass is forcibly entrained in opposite directions at said one side and said opposite side.

5. A process according to claim 1 wherein the transverse width of the path is changed during the advance of said mass.

6. A process according to claim 1 wherein a part of the spent mass from the outlet end of said path is reintroduced into said path and admixed with the mass advancing therealong.

References Cited in the file of this patent

UNITED STATES PATENTS

| | | |
|---|---|---|
| 341,801 | Fox | May 11, 1886 |
| 2,309,989 | Saltzman | Feb. 2, 1943 |
| 2,513,687 | Strenzyski | July 4, 1950 |
| 2,726,957 | Kunz | Dec. 13, 1955 |
| 3,057,726 | Shore | Oct. 9, 1962 |